United States Patent
Wobben

(10) Patent No.: US 7,052,232 B2
(45) Date of Patent: May 30, 2006

(54) METHOD FOR DETERMINING THE ANGLE OF A ROTOR BLADE PERTAINING TO A WIND ENERGY INSTALLATION

(76) Inventor: Aloys Wobben, Argestrasse 19, Aurich D-26607 (DE)

( * ) Notice: Subject to any disclaimer, the term of this patent is extended or adjusted under 35 U.S.C. 154(b) by 0 days.

(21) Appl. No.: 10/332,099

(22) PCT Filed: May 5, 2001

(86) PCT No.: PCT/EP01/05103

§ 371 (c)(1),
(2), (4) Date: Jun. 19, 2003

(87) PCT Pub. No.: WO02/02936

PCT Pub. Date: Jan. 10, 2002

(65) Prior Publication Data

US 2004/0013524 A1 Jan. 22, 2004

(30) Foreign Application Priority Data

Jul. 4, 2000 (DE) ............................... 100 32 314

(51) Int. Cl.
*F01B 25/26* (2006.01)
*F01D 25/00* (2006.01)

(52) U.S. Cl. ........................................ 415/118; 416/61
(58) Field of Classification Search ................ 415/118; 416/61
See application file for complete search history.

(56) References Cited

U.S. PATENT DOCUMENTS

| | | | |
|---|---|---|---|
| 3,515,485 A | 6/1970 | Frank | |
| 5,155,375 A | 10/1992 | Holley | ........................ 290/44 |
| 5,249,470 A | 10/1993 | Hadley et al. | ................. 73/655 |

FOREIGN PATENT DOCUMENTS

| | | | |
|---|---|---|---|
| DE | 197 39 164 A1 | 3/1999 | |
| GB | 1 213 638 | 11/1970 | |
| JP | 59-170475 | * 9/1984 | ................. 415/118 |
| WO | WO 98/42980 | 10/1998 | |
| WO | WO 99/05414 | 2/1999 | |

* cited by examiner

*Primary Examiner*—Theresa Trieu
(74) *Attorney, Agent, or Firm*—Seed Intellectual Property Law Group PLLC

(57) ABSTRACT

The present invention provides a new and improved method for quickly and accurately determining the rotor blade angle of a wind power installation. The present invention also allows for the rotor blade angle measurements to be taken from the ground, thereby allowing the measuring equipment to be easily disconnected and transported to other sites. For example, a rotor blade angle of a wind power installation may be determined by using a spacing measuring device to measure the spacing between the rotor blade and the spacing measuring device. The measurements may then be processed in a computer to calculate the angle between the rotor blade and the spacing measuring device. Once this angle (the α angle) is ascertained, it may be compared to other values to assist in further adjusting the rotor blade angle.

7 Claims, 3 Drawing Sheets

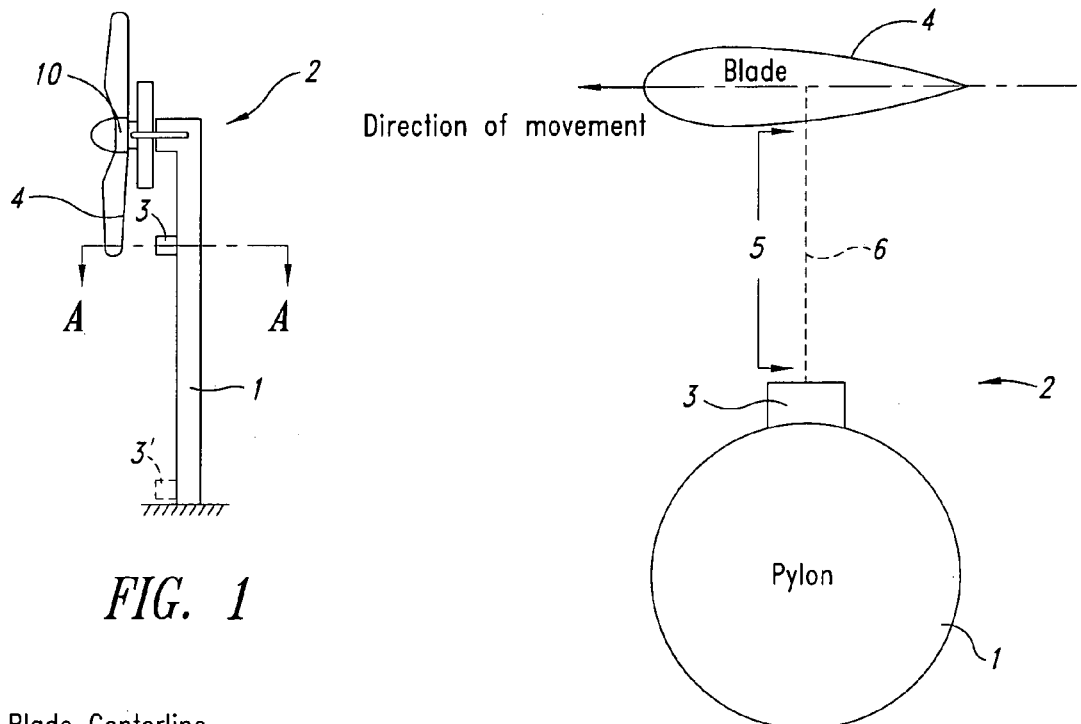
FIG. 1
FIG. 2A
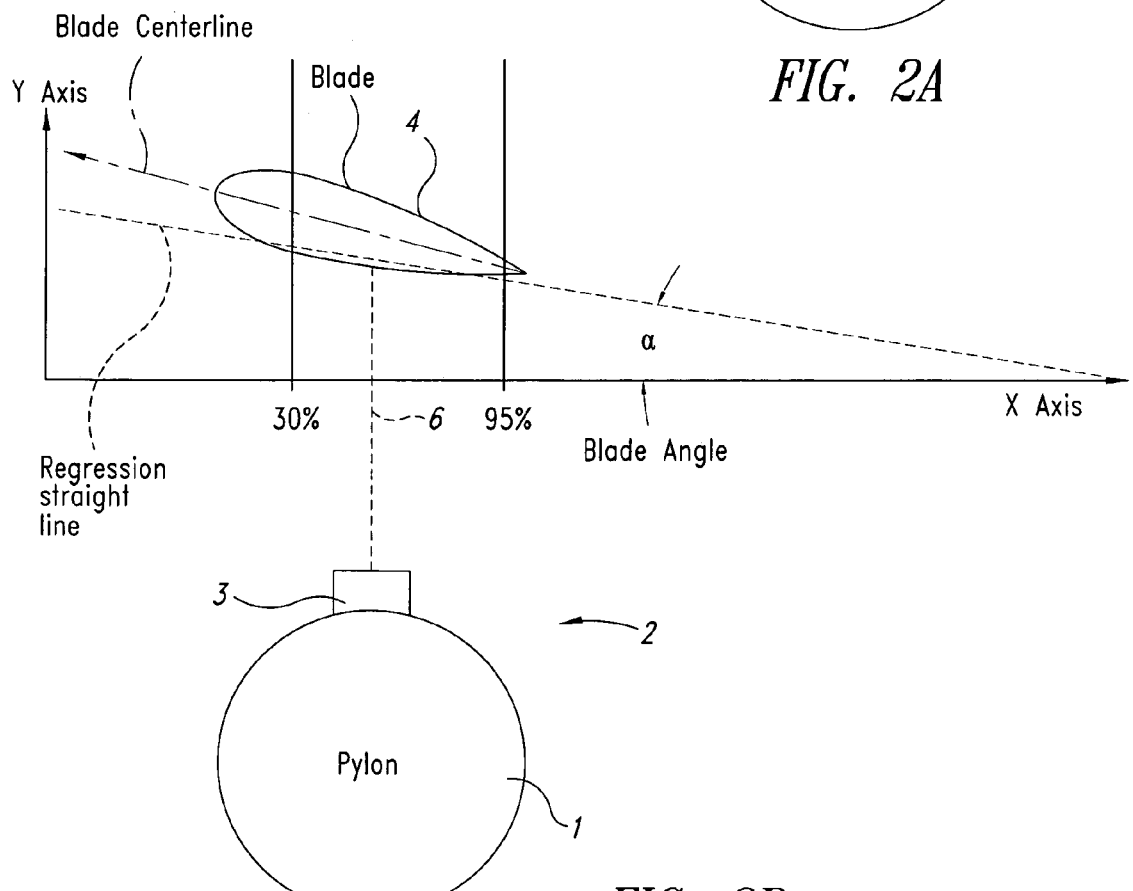
FIG. 2B

METHOD FOR DETERMINING THE ANGLE OF A ROTOR BLADE PERTAINING TO A WIND ENERGY INSTALLATION

BACKGROUND OF THE INVENTION

1. Field of the Invention

The present invention relates generally to methods for determining the rotor blade angle of a wind power installation, including the ability to measure the blade angle from ground level.

2. Description of the Related Art

In pitch-regulated wind power installations the angles of the rotor blades can be adjusted synchronously (standard construction) or independently of each other. The construction for adjustment independently of each other is described in patent application DE 197 31 918. That design can also be referred to as on-line individual blade adjustment. Whether the blades are adjusted synchronously or independently, it is important that an initial blade angle, for example feathered position or maximum blade angle, can be set with a sufficient degree of accuracy.

Moreover, when the synchronous mode of operation is involved, it is necessary to ensure that all blades are adjusted to the same angle. In other words, the relative angle of the rotor blades with respect to one another should be equal to zero.

Maladjustments of the rotor blade angles, which can arise, for example, from manufacturing tolerances (or manufacturing errors) such as displaced zero degree markings or displaced blade connecting bolts, can result in defective operation (wrong rotary speed-output power characteristic) or unbalance phenomena (and thus pylon oscillations and vibrations). Such maladjustments can also result in increased loadings on the components of the installation.

In the known prior art, if after the wind power installation is brought into operation and a defective blade angle setting is suspected, operation is usually implemented with blade jig templates. Jig templates are pushed over the blade tips as far as a defined position on the rotor blade and, with the blade in a horizontal position, a sensor on the jig template measures the angle of the plane of the blade to the surface of the earth (plumb angle). By further 180° rotation of the rotor and renewed measurement, possible inclined positionings of the pylon or any rotor axis angles that may be present are averaged out and the procedure gives the absolute angle of the respective rotor blade.

Even with the advent of sensor systems, which permit wireless data transmission, the above method is costly and complicated, especially with regard to large rotor blades where large jig templates are needed. Applicant therefore believes it is desirable and possible to provide an improved method for determining the rotor blade angle of a wind power installation. The present invention provides such a method.

BRIEF SUMMARY OF THE INVENTION

The present invention provides a new and improved method for quickly and accurately determining the rotor blade angle of a wind power installation. The present invention also allows for the rotor blade angle measurements to be taken from the ground, and thereby allows the measuring equipment to be easily disconnected and transported to other sites. In one embodiment of the present invention, a rotor blade angle of a wind power installation is determined by using a spacing measuring device to measure the spacing between the rotor blade and the spacing measuring device. The measurements are then processed in a computer to calculate the angle between the rotor blade and the spacing measuring device. Once this angle (the $\alpha$ angle) is ascertained, it may be compared to other values to assist in further adjusting the rotor blade angle.

BRIEF DESCRIPTION OF THE SEVERAL VIEWS OF THE DRAWING(S)

In the drawings, the sizes and relative positions of elements are not necessarily drawn to scale. For example, the shapes of various elements and angles are not drawn to scale, and some of these elements are enlarged and positioned to improve drawing legibility.

FIG. 1 shows a side view of a wind power installation having a hub and rotor, a plurality of rotor blades, a pylon, and a spacing measuring device coupled to the pylon.

FIG. 2A shows a cross-sectional view of the wind power installation taken along line A—A of FIG. 1.

FIG. 2B shows a cross-sectional view of the wind power installation taken along line A—A of FIG. 1 showing angles from FIG. 4 superimposed thereon.

DETAILED DESCRIPTION OF THE INVENTION

Figure 3:
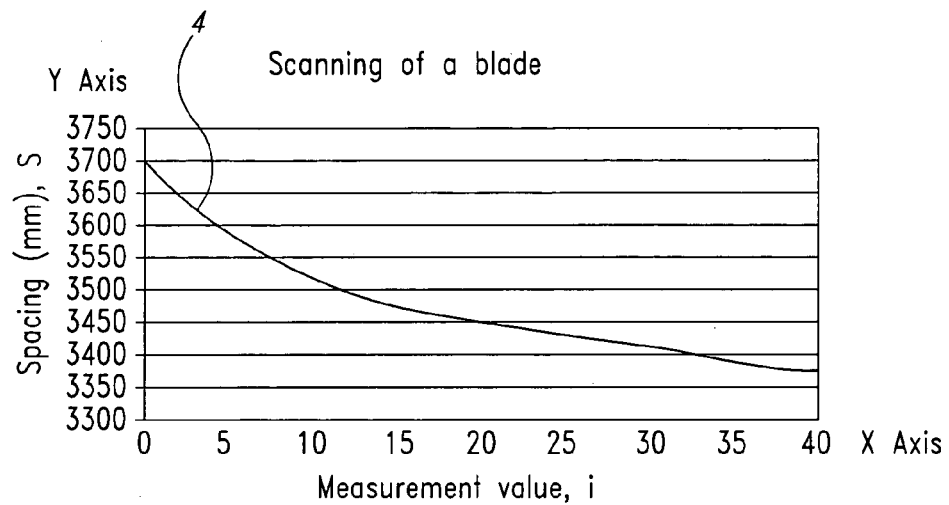
FIGS. 3 and 4 show measuring diagrams for scanning a rotor blade.

As shown in FIGS. 1 and 2, mounted to the pylon 1 of the wind power installation 2 (for example a transmission-less installation) is a laser spacing sensor 3 as a spacing measuring device. When the installation is working, that is to say, when a rotor blade 4 is moved past the pylon 1, the laser spacing sensor 3 may issue a laser beam 6 to measure the spacing 5 between the laser spacing sensor 3 and the blade 4. During the time that the blade 4 moves past the pylon 1, the surface of the blade 4 may be scanned by the laser 6 a plurality of times (for example 40 times) to measure the individual different blade spacings 5 (as illustrated the blade is not of a uniform thickness in its transverse profile, but is markedly thicker at the leading edge than at the trailing edge of the rotor blade).

The data measured (spacing values between the laser spacing sensor 3 and the respective scanned surface of the rotor blade 4) are stored in a computer and processed. By way of mathematical functions, for example regression straight lines, the angle $\alpha$ between the blade 4 and the spacing measuring device 3 can be accurately determined. As explained further below, once the angle $\alpha$ is known, the "true" blade angle (i.e., the angle between the rotor blade 4 and the blade hub 10) can be determined.

Figure 4:
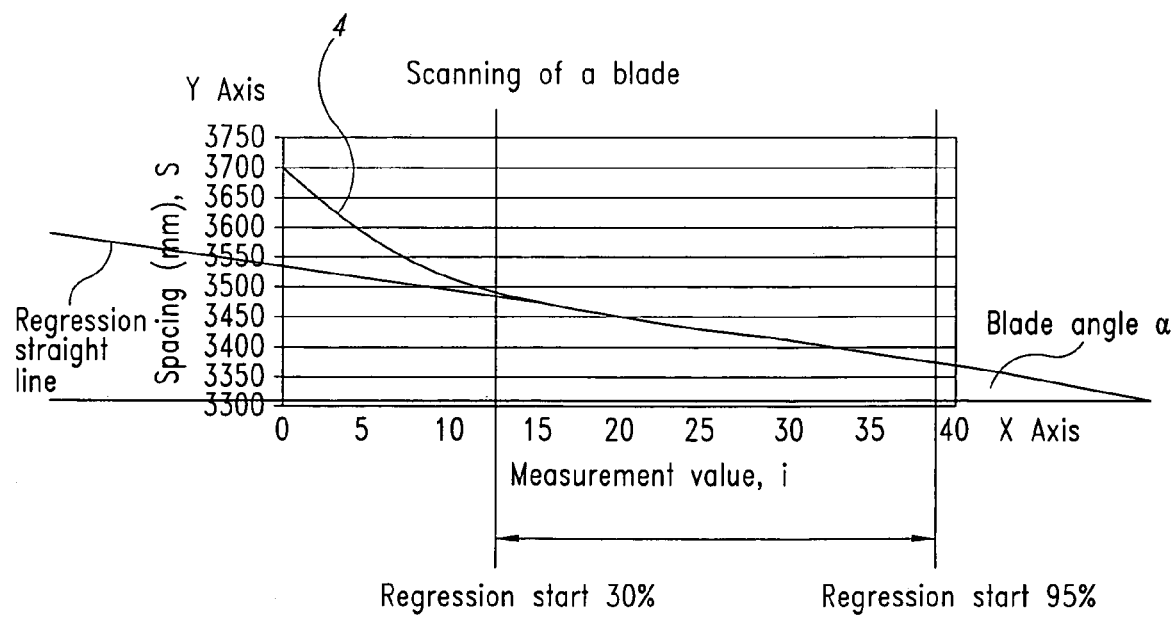

FIG. 2B is similar to FIG. 2A, with the blade at an angle based on the actual angle measurements from the example of FIG. 4. Thus, the data from FIG. 4 has been superimposed on to FIG. 2A to obtain FIG. 2B. It shows a regression straight line at angle $\alpha$ from FIG. 4 based on the location of the surface of the blade 4, the same regression straight line being shown in FIG. 2B as in FIG. 4.

FIG. 3 shows a measurement value representation when scanning a blade 4. The illustrated example shows approximately 40 measurement points with a resolution of about 1 mm. The shape of the curve shows the lower blade profile. The spacing between the blade 4 and the laser spacing sensor 3 is indicated by the Y-axis.

Calculation of the angle α between the spacing measuring device 3 and the blade 4 can be seen from the representation in FIG. 4. In this case, to calculate the blade angle, the rear portion of the blade (about 30% through 95% from leading tip) is viewed in a first approximation as being straight. That region determines the regression straight line which is to be optimally fitted between the measurement points in the range n=30% and n=95%. That is, the data points in this range are numerically fit to a straight line. The gradient of the regression straight line (a) is calculated from the measured data with respect to the spacing measuring device 3. The gradient is calculated in accordance with the following formula:

$$a = \frac{n \cdot \sum_{i=1}^{n} Xi \cdot Yi - \left(\sum_{i=1}^{n} Xi\right) \cdot \left(\sum_{i=1}^{n} Yi\right)}{n \cdot \left(\sum_{i=1}^{n} Xi^2\right) - \left(\sum_{i=1}^{n} Xi\right)}$$

Where:
a=slope of fitted line with respect to spacing measuring device 3;
Xi=sample-point position, i, along the surface of the blade facing the pylon;
Yi=distance from sample-point i to spacing measuring device 3; and
n=total number of sample points.

The angle α between the spacing mesuring device 3 and the blade 4 (in degrees) is now determined by way of α(°)=arctan(a).

In order to improve the measuring accuracy of the method according to the invention, a plurality of blade passages are measured and the data averaged. The measurement results of the individual blades are now compared to each other. Compensation is effected on the basis of those relative angles; that is to say the blades are set to the same angle so that the relative angle becomes zero.

In order to determine the 'true' blade angle(i.e., the angle between the blade 4 and the blade hub 10), the angle between the laser beam 6 and the hub 10 must be known or compared. The true blade angle can then be determined from the angle α 'blade 4 to laser beam 6' and the angle 'hub 10 to laser beam 6'. The laser spacing sensor 3 can also be disposed in any other position. With suitable sensors, measurement could also be effected, for example, from the ground.

Figure 5:
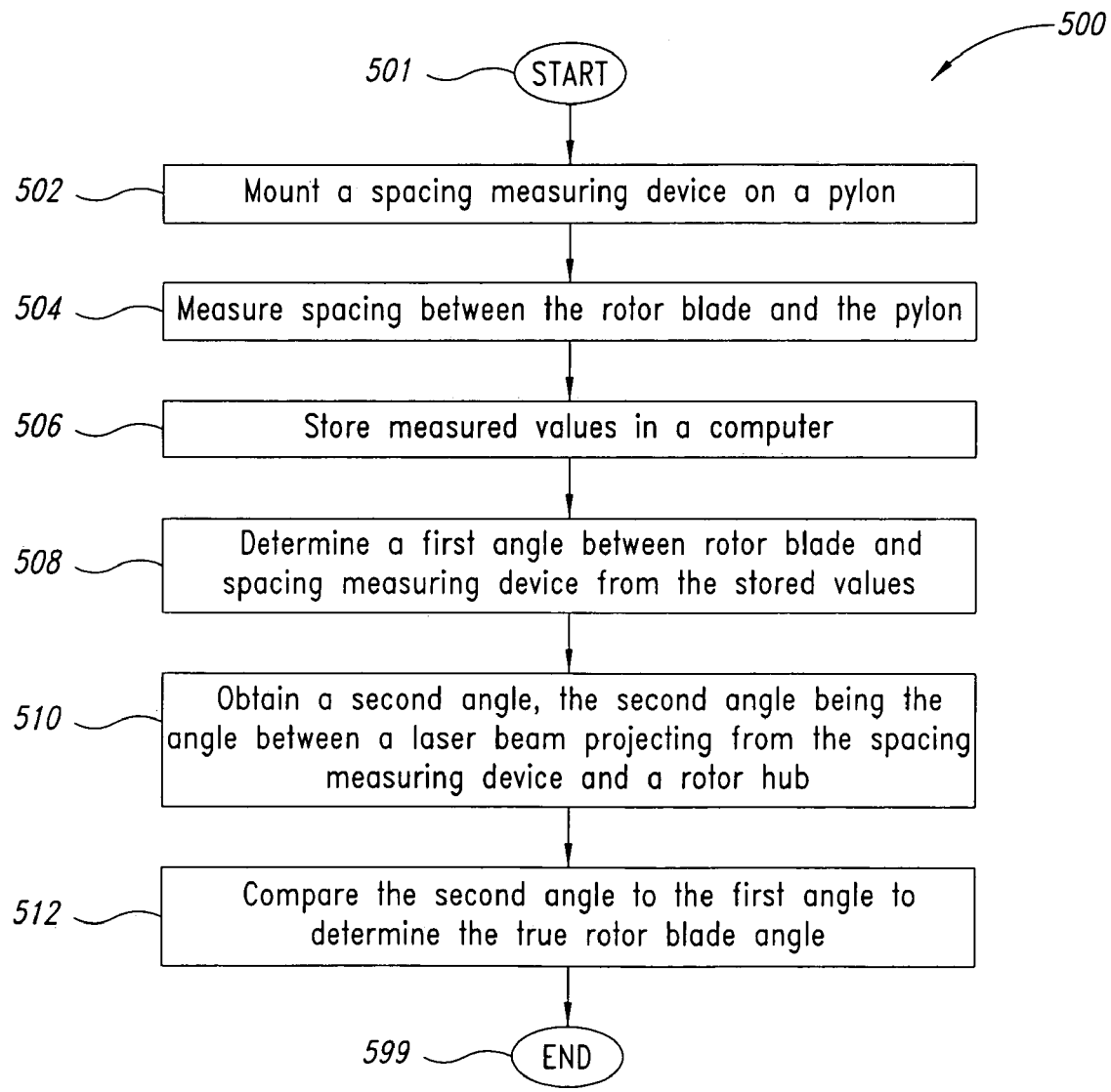
FIG. 5 is a flow diagram of calculation of the rotor blade angle.

FIG. 5 summarizes the process steps involved in the measuring of the true angle of the rotor blade 4 with respect to the hub 10. Processing starts with step 502 wherein the spacing measuring device is attached to an object, such as the pylon 1. The process continues with step 504, measuring the spacing between the blade 4 and the pylon 1. In step 506, the measured values are stored in a computer. Continuing with step 508, a first angle α between the rotor blade 4 and the spacing measuring device 3 is determined based on the stored values. In step 510, a second angle between the laser beam 6 and the hub 10 is determined. In step 512, the first and the second angles are compared to determine the true rotor blade angle between the blade 4 and the hub 10.

In one embodiment, the sensor 3 is positioned on the ground, such as at the base of the pylon, or other location on the ground. This permits ease of service, data collection and electrical connection. For example, in one embodiment, the measuring equipment, including the sensor 3 can be transported from site to site. It can be used at a first wind power installation and then disconnected and moved to another site.

The spacing measuring device 3 may be placed anywhere along the pylon. That is, it can be attached near the blades on the top end of the pylon, or it can be attached at ground-level near the base of the pylon for easy attachment and removal for deployment to different mill sites, shown in dashed lines as in FIG. 1. If a laser beam from the rotor blade 4 is spacing measuring device can project onto the attachment location of the spacing measuring device 3 on the pylon 1 does not affect the scanning or the calculation process.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of determining a rotor blade angle of a wind power installation comprising:
    using a spacing measuring device to measure spacing values between respective scanned surface of the rotor blade and the spacing measuring device;
    storing the values and processing the measurements in a computer to calculate an angle by determining a regression line of said rotor blade, the angle being the angle between the rotor blade and the spacing measuring device.

2. The method according to claim 1 wherein using the spacing measuring device includes measuring the spacing between the rotor blade and the spacing measurement device a plurality of times for a plurality of rotor blade passes to determine the rotor blade angle.

3. A method of adjusting the blade angle of a plurality of rotor blades in a wind power installation comprising:
    using a spacing measuring device to measure the spacing between a first rotor blade and the spacing measuring device, and between a second rotor blade and the spacing measuring device;
    processing the measurements in a computer to calculate a first angle for the first rotor blade and a second angle for the second rotor blade, the first angle being the angle between the first rotor blade and the spacing measuring device and the second angle being the angle between the second rotor blade and the spacing measuring device;
    comparing the first angle of the first rotor blade to the second angle of the second rotor blade; and
    changing the first angle, if necessary, so that the first angle of the first rotor blade is equal to the second angle of the second rotor blade.

4. A method of determining the angle between a rotor blade and a spacing measuring device, comprising:
    measuring the spacing between the rotor blade and the spacing measuring device at defined position at a first location on the blade;
    measuring the spacing between the rotor blade and the spacing measuring device at each of a plurality of subsequent locations on the blade, each of the subsequent locations being at sequentially increasing distance from the first location on the blade; and determining the angle of the rotor blade with respect to the spacing measuring device based on the measured spacing.

5. The method according to claim 4 wherein the spacing measuring device comprises a laser spacing sensor, and a laser beam ascertains the spacing between the space measuring device and the rotor blade as the rotor blade moves past the device.

6. The method according to claim 4 wherein determining the angle of the rotor blade with respect to the spacing measuring device includes the spacing measurement device being located at a pylon of a wind power installation.

7. The method according to claim 4 wherein determining the angle of the rotor blade with respect to the spacing measuring device includes the spacing measurement device being located at ground level.

* * * * *